United States Patent [19]

Kitou et al.

[11] Patent Number: 4,649,465

[45] Date of Patent: Mar. 10, 1987

[54] VOLTAGE STABILIZER FOR A HIGH-VOLTAGE GENERATING CIRCUIT

[75] Inventors: Kouji Kitou; Masashi Ohki, both of Yokohama; Michitaka Ohsawa, Fujisawa, all of Japan

[73] Assignee: Hitachi, Ltd., Tokyo, Japan

[21] Appl. No.: 758,461

[22] Filed: Jul. 24, 1985

[30] Foreign Application Priority Data

Jul. 26, 1984 [JP] Japan ............................. 59-154039
Sep. 10, 1984 [JP] Japan ............................. 59-187927

[51] Int. Cl.$^4$ .............................................. H02M 3/335
[52] U.S. Cl. ...................................... 363/21; 363/89; 323/266
[58] Field of Search ................. 363/19, 20, 21, 89; 323/266

[56] References Cited

U.S. PATENT DOCUMENTS 3,840,797 10/1974 Aggen et al. ....................... 363/21
3,909,702 9/1975 Hart ..................................... 323/266

Primary Examiner—Patrick R. Salce
Assistant Examiner—Anita M. Ault
Attorney, Agent, or Firm—Antonelli, Terry & Wands

[57] ABSTRACT

A high-voltage stabilizing circuit for stabilizing high voltages such as those generated by the fly-back transformer of a television. The stabilizer includes a common-emitter type PNP transistor and an inverse current-absorbing capacitor with a small capacitance in order to provide a high-speed response. The collector of the transistor is connected with the primary coil of the fly-back transformer and the capacitor. The emitter of the transistor is connected with a power source. With this arrangement, even though parabolic wave voltages are generated at the capacitor due to the small capacitance, the PNP transistor hardly cuts off at all and can therefore supply adequate current to the fly-back transformer.

11 Claims, 14 Drawing Figures

VOLTAGE STABILIZER FOR A HIGH-VOLTAGE GENERATING CIRCUIT

BACKGROUND OF THE INVENTION

The present invention relates to a voltage stabilizer for stabilizing the output voltage of a high-voltage generating circuit supplied to a cathode-ray tube in a television receiver, display unit or the like.

Voltage stabilizers for a high-voltage generating circuit have been disclosed in Japanese Patent Laid-Open Nos. 149178/1981 (conventional example 1) and 140771/1981 (conventional example 2). According to voltage stabilizers disclosed in these publications, a high output voltage is divided by voltage-dividing resistors or the like, the divided high output voltage is compared with a reference voltage, and the power-source voltage for the high-voltage generating circuit is so controlled that the difference is minimized between the above two voltages, so that the high output voltage is stabilized.

Figure 10:
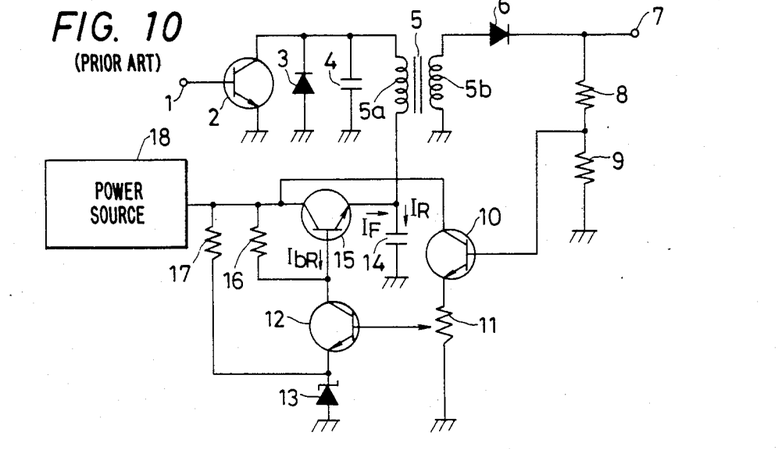
FIG. 10 is a diagram showing a conventional high-voltage stabilizer.

FIG. 10 schematically shows the voltage stabilizer disclosed in the conventional example 1, which consists of a switching pulse input terminal 1, a switching transistor 2 for producing high voltage, a damper diode 3, a resonance capacitor 4, a fly-back transformer 5, a high-voltage rectifier diode 6, a high-voltage output terminal 7, resistors 8, 9, 16, 17, a detector transistor 10, a variable resistor 11, an error amplifier transistor 12, a Zener diode 13, an inverse current absorbing capacitor 14, a control transistor 15, and a power source 18.

Operation of the conventional voltage stabilizer will be described below.

The high voltage-producing transistor 2 shunts one end of a primary coil 5a of the fly-back transformer 5 responsive to switching pulses that are input to the switching pulse input terminal 1 and that have a period $T_H$. Therefore, a pulse-like current flows in the primary coil 5a of the fly-back transformer 5, and a high voltage is induced in the secondary coil 5b. The rectifier diode 6 rectifies the high voltage and sends a high d-c voltage to the high-voltage output terminal 7.

The d-c high voltage is divided by the resistors 8, 9, and is applied to the base of error amplifier transistor 12 via detector transistor 10 and variable resistor 11. The detector transistor 10 must have a high input impedance; hence, it is used in the form of an emitter follower circuit. The emitter of the error amplifier transistor 12 is connected to a reference voltage source which consists of Zener diode 13 and resistor 17, and the collector thereof is connected to the base of control transistor 15.

Here, as the current driven by high voltage flows through the secondary coil 5b of the fly-back transformer 5 and the high output voltage appearing on the high-voltage output terminal 7 decreases, the base voltage of the detector transistor 10 decreases and the base voltage of the error amplifier transistor 12 decreases, too, causing the base voltage of the control transistor 15 to increase. Therefore, emitter voltage of the control transistor 15 increases, increased pulse-like current flows in the primary coil 5a of the fly-back transformer 5, and an increased voltage is produced by the secondary coil 5b.

As the voltage appearing on the high-voltage output terminal 7 increases, the voltage stabilizer operates inversely, whereby the base voltage of the control transistor 15 decreases, and the secondary coil 5b of the fly-back transistor 5 produces a decreased voltage.

According to this voltage stabilizer as described above, the voltage appearing on the high-voltage output terminal 7 is compared with the voltage of a reference voltage source which consists of resistor 17 and Zener diode 13, and the output voltage is so controlled as to be equal to the voltage of the reference voltage source at all times.

The high-voltage stabilizer of the type in which the power source is controlled, mentioned above, features stable operation but has the disadvantage of slow response speed. The reason for this disadvantage will be described below.

In FIG. 10, the inverse current absorbing capacitor 14 absorbs the inverse current $I_R$ that flows through the damper diode 3, so that the emitter voltage of the control transistor 15 is stabilized to assume a d-c voltage. The capacitor 14 must have a large capacity to sufficiently absorb the inverse current $I_R$. Therefore, the time constant for charge and discharge of the capacitor 14 increases, and the response time for the control operation increases.

Figure 11A:
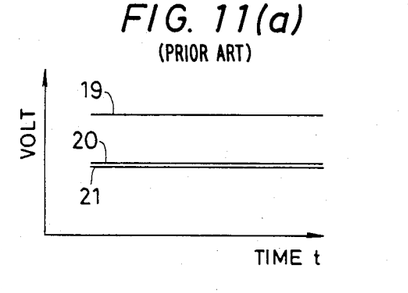
FIG. 11(a) is a diagram of voltage waveforms for explaining the operation of control transistor of FIG. 10.
Figure 11B:
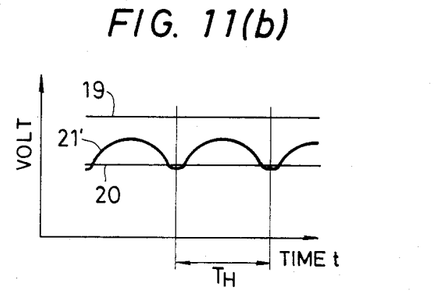
FIG. 11(b) show the effects of reducing the capacitance of the capacitor 14

If the capacity of the capacitor 14 is reduced to increase the response speed, the terminal voltage of the capacitor 14 assumes a parabolic waveform of a period $T_H$, and the waveform of the control transistor 15 changes from the waveform shown in FIG. 11(a) into the wavefrom shown in FIG. 11(b). Namely, the emitter voltage 21' of the control transistor 15 rises and is cut off when it has exceeded the base voltage; i.e., switching operation is performed. In FIGS. 11(a) and 11(b), a line 19 represents a collector voltage, a line 20 represents a base voltage, and lines 21, 21' represent emitter voltages.

When the control transistor 15 is cut off, an inverse base current $I_{bR}$ flows out from the base thereof. Therefore, the base current of the control transistor 15 goes unstable and oscillates.

Figure 12:
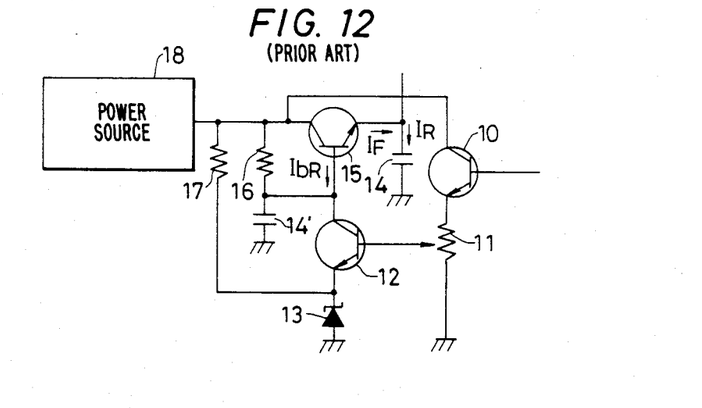
FIG. 12 is a diagram showing another conventional voltage stabilizer.

In order to prevent this oscillation, a method has been proposed as shown in FIG. 12 to stabilize the base voltage by providing a capacitor 14' which absorbs an inverse base current between the base of the control transistor 15 and ground. With this method, however, the capacitor 14' must have a large capacity. Hence, the time constant for charge and discharge becomes so large that it is difficult to quicken the response for control.

If the capacity of the inverse current-preventing capacitor 14 is further reduced, the peak value of the voltage of the parabolic waveform at the terminal of the capacitor 14 exceeds the emitter-base withstand voltage of the control transistor 15 to destroy the transistor.

Furthermore, if there is a portion where the brightness changes greatly on the screen of a cathode-ray tube which is connected to the high-voltage output terminal 7, the high-voltage output current that flows into the cathode-ray tube changes rapidly, and the voltage also changes at the high-voltage output terminal 7. In this case, however, control operation for the power-source voltage by the voltage stabilizer cannot sufficiently follow the above-mentioned change in voltage. Therefore, there develop such malfunctions as fluctuating screen amplitude, deviating convergence, loss of focusing, and the like.

SUMMARY OF THE INVENTION

The object of the present invention is to provide a voltage stabilizer for a high-voltage generating circuit, which enables the capacity of the inverse current absorbing capacitor to be reduced, which exhibits a high response speed and which operates stably.

Another object of the present invention is to provide a voltage stabilizer which is capable of sufficiently responding to sudden changes in the output of the high-voltage power source circuit.

In the high-voltage stabilizer of the present invention, the feature resides in the provision of a control transistor of the common-emitter type, and an inverse current absorbing capacitor having a capacity that is selected within a range such that the terminal voltage of the capacitor does not exceed the base voltage of the control transistor.

Another feature of the present invention resides in that provision is made for a diode in which the anode is connected to the collector of the common-emitter type control transistor and in which the cathode is connected to the primary coil of a fly-back transformer, and that an electric current is supplied from the cathode of the diode to a high-voltage generating circuit, so that the output capacity of the high-voltage generating circuit can be reduced.

A further feature of the present invention resides in that a high-voltage output current of the high-voltage generating circuit is detected, and the control transistor is controlled at a high speed by a differentiation signal of the current, so that the control can closely follow rapid changes in the high-voltage output current.

DETAILED DESCRIPTION OF THE PREFERRED EMBODIMENTS

Figure 1:
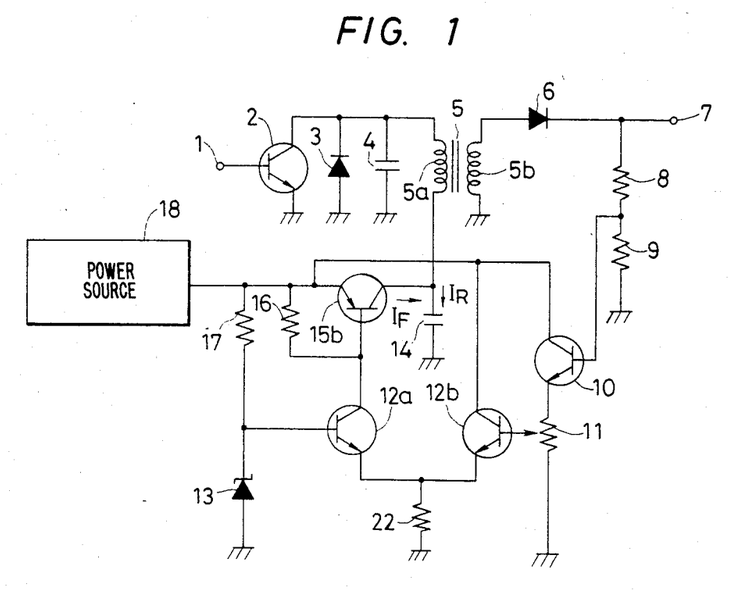
FIG. 1 is a diagram of a high-voltage stabilizer in a first embodiment of the present invention.

A first embodiment of the present invention is shown in FIG. 1.

The voltage stabilizer according to the present invention comprises a switching pulse input terminal 1, a switching transistor 2 for producing a high voltage, a damper diode 3, a resonance capacitor 4, a fly-back transformer 5, a high-voltage rectifier diode 6, a high-voltage output terminal 7, resistors 8, 9, 16, 17, a detector transistor 10, a variable resistor 11, error amplifier transistors 12a, 12b, a Zener diode 13, an inverse current absorbing capacitor 14, a control transistor 15b of the commonemitter type, and a power source 18 .

The difference that distinguishes the voltage stabilizer of the present invention from the conventional voltage stabilizer of FIG. 10 is that the voltage stabilizer of the invention employs a common-emitter type transistor as the control transistor, as well as a differential amplifier circuit which consists of error amplifier transistors 12a, 12b.

Figure 2:
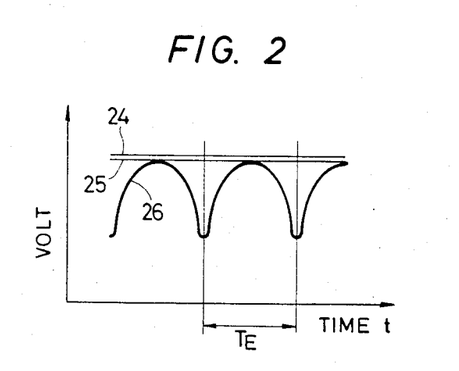
FIG. 2 is a diagram of voltage waveforms for explaining the operation of the control transistor in the high-voltage stabilizer of FIG. 1.

FIG. 2 shows operation waveforms of the control transistor 15b, wherein a line 24 represents the emitter voltage, a line 25 represents the base voltage, and a line 26 represents the collector voltage.

Operation of the circuit will be described below.

As a high-voltage output current flows from a high-voltage generating circuit through the high-voltage output terminal 7, the output voltage decreases at the high-voltage output terminal 7. The change in voltage is divided by the voltage-dividing resistors 8, 9, and is transmitted to the base of transistor 10, so that the base voltage of transistor 10 decreases. Therefore, the emitter current of transistor 10 decreases correspondingly.

The error amplifier transistors 12a, 12b form a differential amplifier circuit. The base of one transistor 12a in the differential amplifier circuit is connected to a constant-voltage source which consists of resistor 17 and Zener diode 13, and the base of another transistor 12b is connected to the resistor 11 which converts the emitter current of transistor 10 into a voltage. Therefore, if the emitter current of transistor 10 decreases, the base voltage of transistor 12b decreases, the collector current of transistor 12b decreases, and the collector current of transistor 12a increases.

If the collector current of transistor 12a increases, the base voltage of transistor 15b decreases, the collector voltage of control transistor 15b increases, and the voltage at the high-voltage output terminal 7 increases via the fly-back transformer 5, so that the voltage drop at the terminal 7 is compensated.

According to the embodiment of the present invention employing the common-emitter type transistor 15b as a control transistor, if the emitter voltage (denoted by 24 in FIG. 2) of the control transistor 15b is set, for example, to 100 volts, the base voltage (denoted by 25 in FIG. 2) becomes about 99 volts. In the conventional circuit of FIG. 10, if the collector voltage (denoted by 19 in FIG. 11(a)) of the control transistor 15 is set to 100 volts, the emitter voltage (denoted by 20 in FIG. 11(a)) thereof becomes about 90 volts.

According to the embodiment of the present invention, therefore, the terminal voltage of the inverse current absorbing capacitor 14 on the side of the fly-back transformer 5 can be increased by about 9 volts compared with that of the conventional circuit, and the capacity of the inverse current absorbing capacitor 14 can be reduced correspondingly.

If the capacity of the inverse current absorbing capacitor 14 is reduced, the terminal voltage of the capacitor 14 assumes a parabolic waveform a period $T_H$ as represented by a line 26 in FIG. 2. However, the capacity of the capacitor can be reduced to a range in which the maximum value of the parabolic waveform does not exceed the base voltage 25. In the experiment, the capacity could be reduced to about one-tenth the capacity of the conventional circuit.

In this embodiment as described above, the capacity of the inverse current absorbing capacitor can be reduced compared with that of the conventional circuit, and the response speed for control operation can be increased without losing stability in operation.

Next, a second embodiment of the invention will be described below in conjunction with FIG. 3. In the voltage stabilizer of this embodiment, an inverse flow-preventing diode 23 is connected to the collector of the control transistor 15b.

Figure 3:
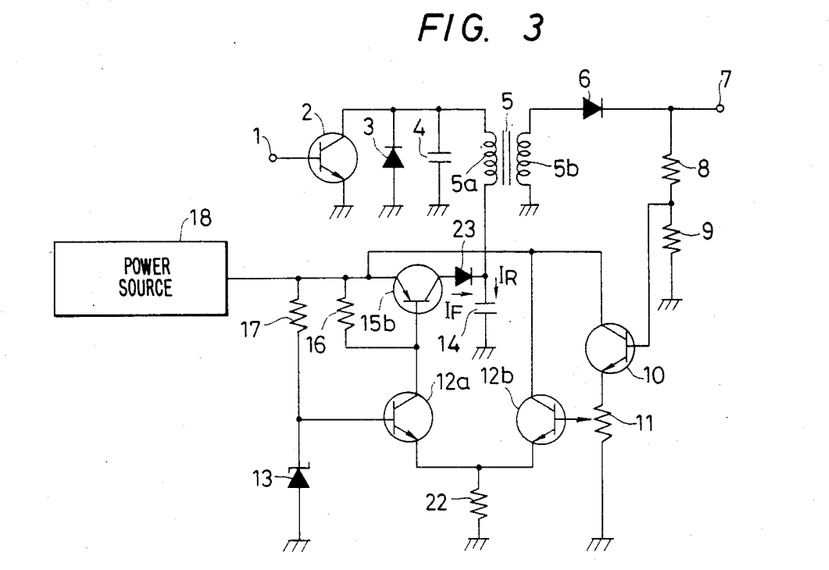
FIG. 3 is a diagram of a circuit according to a second embodiment of the present invention.
Figure 4:
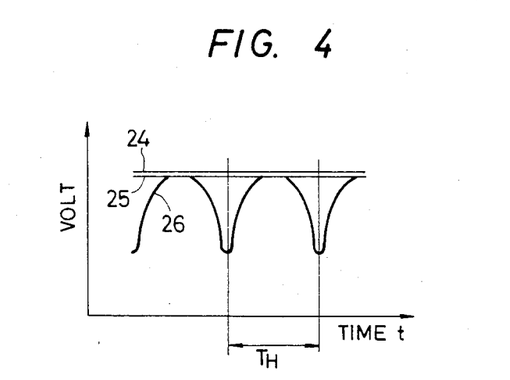
FIG. 4 is a diagram of voltage waveforms for explaining the operation of control transistor of FIG. 3.

FIG. 4 shows operation waveforms of the control transistor 15b of FIG. 3. In FIGS. 3 and 4, the same reference numerals as those of FIGS. 1 and 2 denote the same members.

In the second embodiment, the control transistor 15b does not perform cut-off operation, since the base and emitter thereof are biased in the forward direction at all times. Furthermore, since the collector voltage of the control transistor 15b is clamped to the base voltage by the inverse flow-preventing diode 23, the inverse current does not flow from the collector to the base even when the terminal voltage of the inverse current absorbing capacitor 14 becomes greater than the base voltage of the control transistor 15b. For this reason, the capacity of the inverse current absorbing capacitor 14 can be further reduced compared with that of the first embodiment.

According to the second embodiment as described above, the common-emitter type transistor is used as the control transistor, and the inverse flow-preventing diode is connected to the collector thereof. Therefore, the inverse current absorbing capacitor 14 must have a capacity which is much less than that of the conventional circuit. Moreover, since no time constant circuit exists in the control loop or in other portion of the circuit, the response speed for control operation can be greatly increased.

Figure 5A:
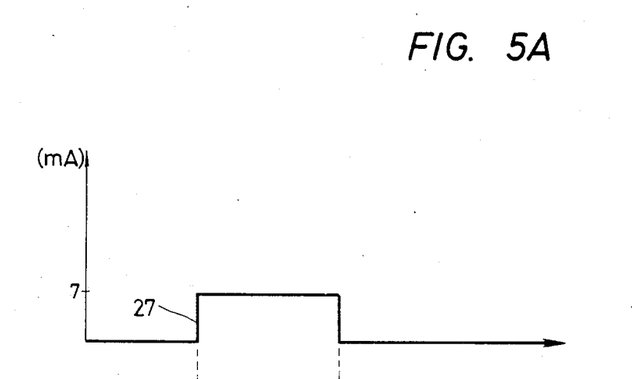
FIG. 5 is a diagram of characteristics comparing transient response characteristics of the high-voltage stabilizer of the second embodiment with those of the conventional high-voltage stabilizer.
Figure 5B:
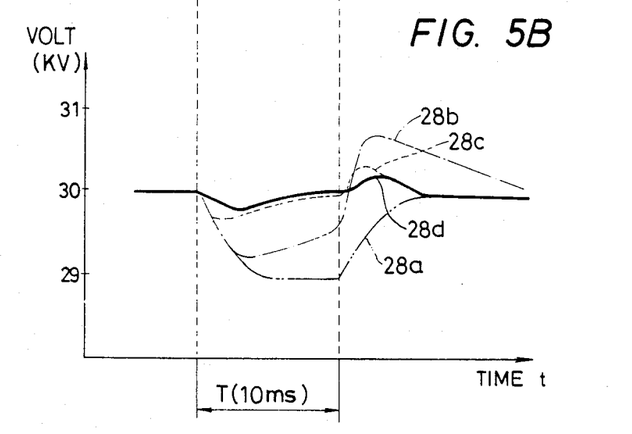

FIG. 5 shows transient response characteristics in the control operation with the conventional high-voltage stabilizer in comparison with those of the high-voltage stabilizer according to the second embodiment of the present invention. FIG. 5(A) shows a high-voltage output current that flows into the high-voltage output terminal 7, and FIG. 5(B) shows the change in the high-voltage output at the high-voltage output terminal 7 when a pulse-like current of 7 mA having a pulse width T of 10 milliseconds flows into the high-voltage output terminal 7 as shown in FIG. 5(A). In FIG. 5, a line 27 represents a high-voltage output current, a line 28a represents a high-voltage output when there exists no high-voltage stabilizer, a line 28b represents a high-voltage output produced by the conventional high-voltage stabilizer, and a curve 28c represents a high-voltage output produced by the high-voltage stabilizer according to the second embodiment of the present invention.

In the present invention as will be comprehended from the line 28c, the response speed is faster than that of the conventional voltage stabilizer, and deviation from the desired voltage is minimized.

Figure 6:
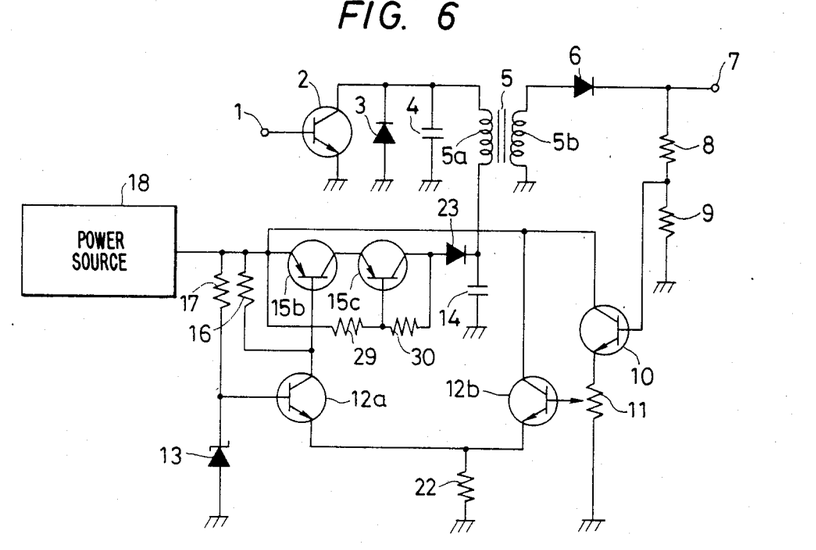
FIG. 6 is a diagram of a circuit according to a third embodiment of the present invention.

FIG. 6 shows a third embodiment of the present invention.

In the voltage stabilizer of this embodiment, the feature resides in that a second control transistor 15c is connected in series between the control transistor 15b and the inverse flow-preventing diode 23, a resistor 29 is connected between the base of control transistor 15c and the emitter of control transistor 15b, and a resistor 30 is connected between the base and the collector of control transistor 15c.

The control transistors 15b, 15c are connected in series. By suitably selecting the resistances of resistors 29, 30, the transistors 15b, 15c can be driven on a collector-emitter voltage which is onehalf that of the control transistor 15b of FIG. 3. Even when the power source has a high voltage, therefore, a low-voltage transistor can be used as the control transistor.

Except for the above-mentioned point, the circuit of FIG. 6 operates in the same manner as the circuit of FIG. 3.

Figure 7:
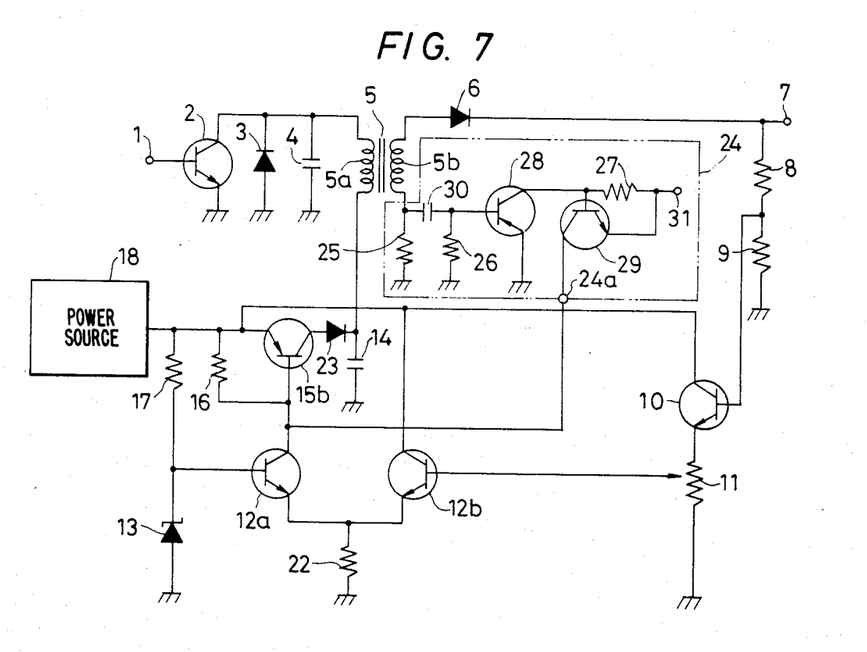
FIG. 7 is a diagram of a circuit according to a fourth embodiment of the present invention.

FIG. 7 shows a fourth embodiment of the present invention.

According to this embodiment, the voltage stabilizer consists of the voltage stabilizer of the second embodiment which is equipped with a second control circuit 24 to control the control transistor 15b depending upon the high-voltage output current. For easy explanation, the voltage stabilizer comprised of transistors 10, 12a, 12b of the second embodiment is referred to as a first control circuit.

The second control circuit 24 is comprised of resistors 25, 26, 27, transistors 28, 29, a capacitor 30, and a negative power source input terminal 31. The capacitor 30 and the resistor 26 constitute a differentiation circuit. Output of the differentiation circuit is supplied to the base of control transistor 15b via transistors 28, 29.

The differentiation circuit detects the change in high-voltage output current that flows through the secondary coil of the fly-back transformer 5, and controls the base voltage of control transistor 15b responsive to the detected voltage, in order to increase the response speed of the voltage stabilizer.

Operation will be described below. The high-voltage output current flowing through the secondary coil 5b of the fly-back transformer is converted into a voltage through the resistor 25, and is detected. The differentiation circuit consisting of capacitor 30 and resistor 26 produces a differentiation voltage signal which is proportional to the intensity of change in the high-voltage output current, and supplies it to the base of the transistor 28. The collector of transistor 28 is connected to the negative power source input terminal 31 via resistor 27. Depending upon the voltage which generates across the resistor 27, the transistor 29 controls the base voltage of control transistor 15b. If now the high-voltage output current suddenly increases, a large negative voltage is applied to the base of transistor 28 via the differentiation circuit, and the collector current of transistor 28 quickly increases. Accordingly, the voltage drops greatly across the resistor 27, and the collector voltage of transistor 29 drops quickly, i.e., the base voltage of control transistor 15b drops quickly, such that the collector voltage of control transistor 15b rises quickly, thereby to restrain the high output voltage from decreasing. The time constant of the differentiation circuit is so set that the above-mentioned operation is carried out until the first control means in the constant-voltage control system comprised of transistors 10, 12a, 12b mentioned in the second embodiment, starts to operate, in order to prevent the interaction between the second control means and the first control means. That is, the circuit of FIG. 7 consists of a combination of the first and second control systems that are divided by frequency, i.e., a constant-voltage (absolute value) control system which detects the high output voltage responsive to the change in high-voltage load (high-voltage output current) of direct current and of relatively low frequencies, and a relative value control system which detects the change (differentiation signal) in high-voltage output current responsive to the change in high-voltage load of relatively high frequencies, making it possible to perform the control operation stably and at high speeds.

The line 28d of FIG. 5 represents transient response characteristics of the voltage stabilizer of this embodiment.

It is evident from FIG. 5 that the fourth embodiment exhibits further increased response speed and reduced voltage variation as represented by the line 28d compared with those of the second embodiment represented by the line 28c.

Figure 8:
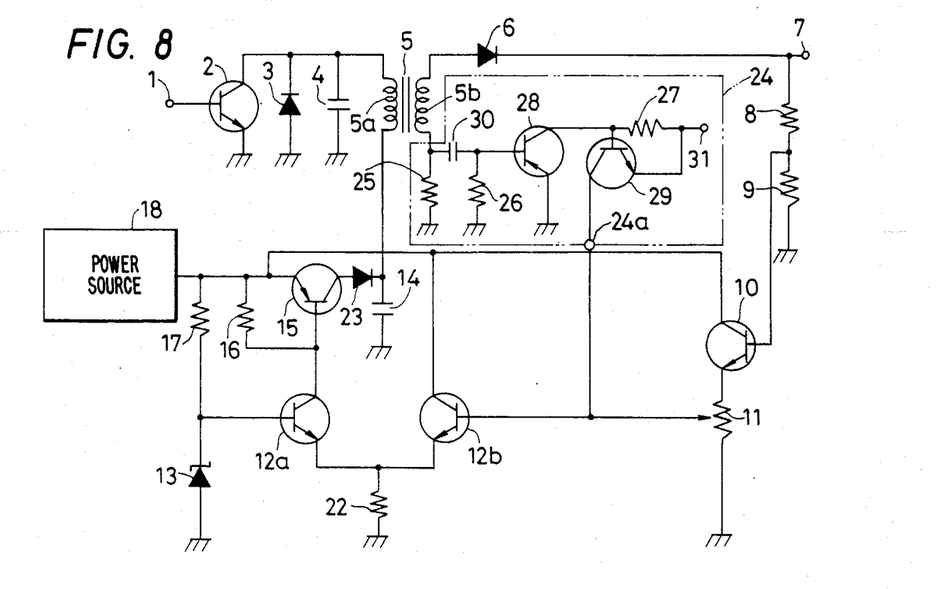
FIG. 8 is a diagram showing a first modified example of the fourth embodiment of the present invention.

FIG. 8 shows a modified example of the voltage stabilizer of FIG. 7. In this voltage stabilizer, the output terminal 24a of the second control circuit 24 is connected to the base of the error-detecting transistor 12b.

Since the transistors 12a, 12b constitute a differential amplifier, changing the base voltage of the transistor 12b is equivalent to changing the base voltage of the transistor 15b. Therefore, the voltage stabilizer of FIG. 8 operates in the same manner as the voltage stabilizer of FIG. 7.

Figure 9:
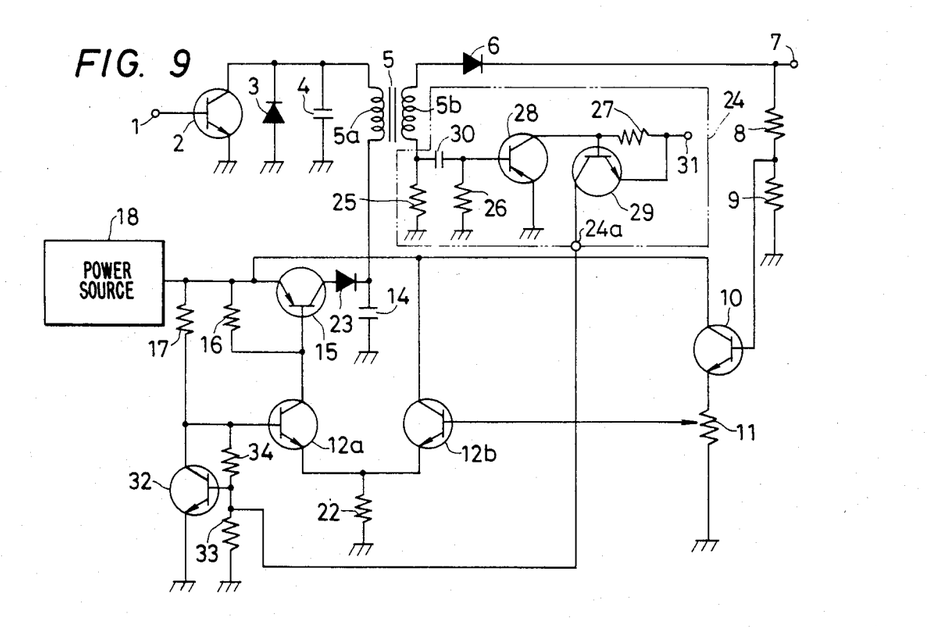
FIG. 9 is a diagram showing a second modified example of the fourth embodiment of the present invention.

FIG. 9 shows another modified example.

According to this modified example, provision is made for a voltage-controlled constant-voltage circuit made up of a transistor 32, and resistors 33, 34, as a reference voltage source, instead of the Zener diode 13, and the output terminal of the second control circuit is connected to the base of the transistor 32. Output voltage of the constantvoltage circuit varies depending upon the output of the second control circuit 24, whereby the reference voltage applied to the base of transistor 12a varies. Namely, the voltage stabilizer controls the high-voltage output depending upon the change in the high-voltage output current like the voltage stabilizer of FIG. 7.

In the foregoing description of the invention, an attempt was made to reduce the capacity of the inverse current absorbing capacitor 20. In practice, however, the distributed capacity determined by the circuit construction of equipment, kinds of parts, and arrangement thereof, may virtually serve the function of inverse current absorbing capacitor 20.

What we claim is:

1. In a voltage stabilizer for a high-voltage generating circuit comprising:
   (1) a high-voltage generating circuit having a fly-back transformer, a high-voltage output transistor of which the collector is connected to a first terminal of the primary coil of the fly-back transformer, a resonance capacitor connected in parallel with said high-voltage output transistor, an inverse current absorbing capacitor connected to a second terminal of the primary coil of said fly-back transformer, and a rectifier connected in series with the secondary coil of said fly-back transformer;
   (2) a detector circuit which is connected to the output terminal of said high-voltage generating circuit, and which detects the voltage produced by said high-voltage generating circuit;
   (3) a reference voltage source which generates a reference voltage;
   (4) control means which is connected to said high-voltage generating circuit, said reference voltage source, and to said detector circuit, and which so controls the power source voltage applied to the primary coil of said fly-back transformer that the difference between the reference voltage and the detected voltage is minimized; and
   (5) a power source which is connected to said control means;
   the improvement wherein said control means comprises:
   a. a control transistor of the common-emitter PNP type of which the collector is connected to the second terminal of the primary coil of said fly-back transformer, and of which the emitter is connected to said power source; and
   b. a differential amplifier circuit having a first transistor of which the base is connected to said reference voltage source and of which the collector is connected to the base of said control transistor, a second transistor of which the base is connected to said detector circuit and of which the emitter is connected to the emitter of said first transistor, and a resistor connected between the collector of said first transistor and said power source,
   wherein the capacitance of said inverse current absorbing capacitor is selected to be sufficiently small to generate a voltage with a parabolic waveform.

2. A voltage stabilizer for a high-voltage generating circuit according to claim 1, wherein the capacity of said inverse current absorbing capacitor is selected within a range in which the voltage across the terminals of said inverse current absorbing capacitor does not exceed the base voltage of said control transistor.

3. A voltage stabilizer for a high-voltage generating circuit according to claim 1, wherein said control circuit has a diode, the anode thereof being connected to the collector of said control transistor and the cathode thereof being connected to said inverse current absorbing capacitor.

4. A voltage stabilizer for a high-voltage generating circuit according to claim 3, wherein the capacity of said inverse current absorbing capacitor is selected within a range in which the voltage across the terminals of said inverse current absorbing capacitor does not exceed the base voltage of said control transistor.

5. A voltage stabilizer for a high-voltage generating circuit comprising:
   (1) a high-voltage generating circuit having a fly-back transformer, a high-voltage output transistor of which the collector is connected to a first terminal of the primary coil of the fly-back transformer, a resonance capacitor connected in parallel with said high-voltage output transistor, an inverse current absorbing capacitor connected to a second terminal of the primary coil of said fly-back transformer, and a rectifier connected in series with the secondary coil of said fly-back transformer;
   (2) a detector circuit which is connected to the output terminal of said high-voltage generating circuit, and which detects the voltage produced by said high-voltage generating circuit;

(3) a reference voltage source which generates a reference voltage;

(4) control means which is connected to said high-voltage generating circuit, said reference voltage source, and to said detector circuit, and which so controls the power source voltage applied to the primary coil of said fly-back transformer that the difference between the reference voltage and the detected voltage is minimized; and (5) a power source which is connected to said control means;

the improvement wherein said control means comprises:

a. a control transistor of the common-emitter type of which the collector is connected to the second terminal of the primary coil of said fly-back transformer, and of which the emitter is connected to said power source; and b. a differential amplifier circuit having a first transistor of which the base is connected to said reference voltage source and of which the collector is connected to the base of said control transistor, a second transistor of which the base is connected to said detector circuit and of which the emitter is connected to the emitter of said first transistor, and a resistor connected between the collector of said first transistor and said power source, wherein said control circuit has a diode, the anode thereof being connected to the collector of said control transistor and the cathode thereof being connected to said inverse current absorbing capacitor, and wherein said control circuit has a second control transistor which is connected in series with said control transistor.

6. In a voltage stabilizer for a high voltage generating circuit comprising:

(1) a high-voltage generating circuit having a fly-back transformer, a high-voltage output transistor of which the collector is connected to a first terminal of the primary coil of the fly-back transformer, a resonance capacitor connected in parallel with said high-voltage output transistor, an inverse current absorbing capacitor connected to a second terminal of the primary coil of said fly-back transformer, and a rectifier connected in series with the secondary coil of said fly-back transformer;

(2) a detector circuit which is connected to the output terminal of said high-voltage generating circuit, and which detects the voltage produced by said high-voltage generating circuit;

(3) a reference voltage source which generates a reference voltage;

(4) control means which is connected to said high-voltage generating circuit, said reference voltage source, and to said detector circuit, and which so controls the power source voltage applied to the primary coil of said fly-back transformer that the difference between the reference voltage and the detected voltage is minimized; and (5) a power source which is connected to said control means;

the improvement wherein said control means comprises: a first control circuit made up of;

a. a control transistor of the common-emitter type of which the collector is connected to the first terminal of said fly-back transformer and of which the emitter is connected to said power source; and b. a differential amplifier circuit having a first transistor of which the base is connected to said reference voltage source and of which the collector is connected to the base of said control transistor, a second transistor of which the base is connected to said detector circuit and of which the emitter is connected to the emitter of said first transistor, and a resistor connected between the collector of said first transistor and said power source; and a second control circuit having a second detector circuit that is connected to said fly-back transformer and said first control circuit to detect a high-voltage output current flowing through the secondary coil of said fly-back transformer, in order to control the base voltage of the control transistor of said first control circuit depending upon the detected output.

7. A voltage stabilizer for a high-voltage generating circuit according to claim 6, wherein the capacity of said inverse current absorbing capacitor is selected within a range in which the voltage across the terminals of said inverse current absorbing capacitor does not exceed the base voltage of said control transistor.

8. A voltage stabilizer for a high-voltage generating circuit according to claim 7, wherein said second control circuit has a differentiation circuit for differentiating said high-voltage output current.

9. A voltage stabilizer for a high-voltage generating circuit according to claim 8, wherein the output terminal of said second control circuit is connected to the base of said control transistor.

10. A voltage stabilizer for a high-voltage generating circuit according to claim 8, wherein the output terminal of said second control circuit is connected to the base of said second transistor.

11. A voltage stabilizer for a high-voltage generating circuit according to claim 8, wherein said reference voltage source has a voltagecontrolled constant-voltage circuit, and the output terminal of said second control circuit is connected to the control input terminal of said voltage-controlled constant-voltage circuit.

* * * * *